March 27, 1934.   H. J. FINDLEY   1,952,198
THERMOSTATIC VALVE DEVICE
Filed Aug. 3, 1932
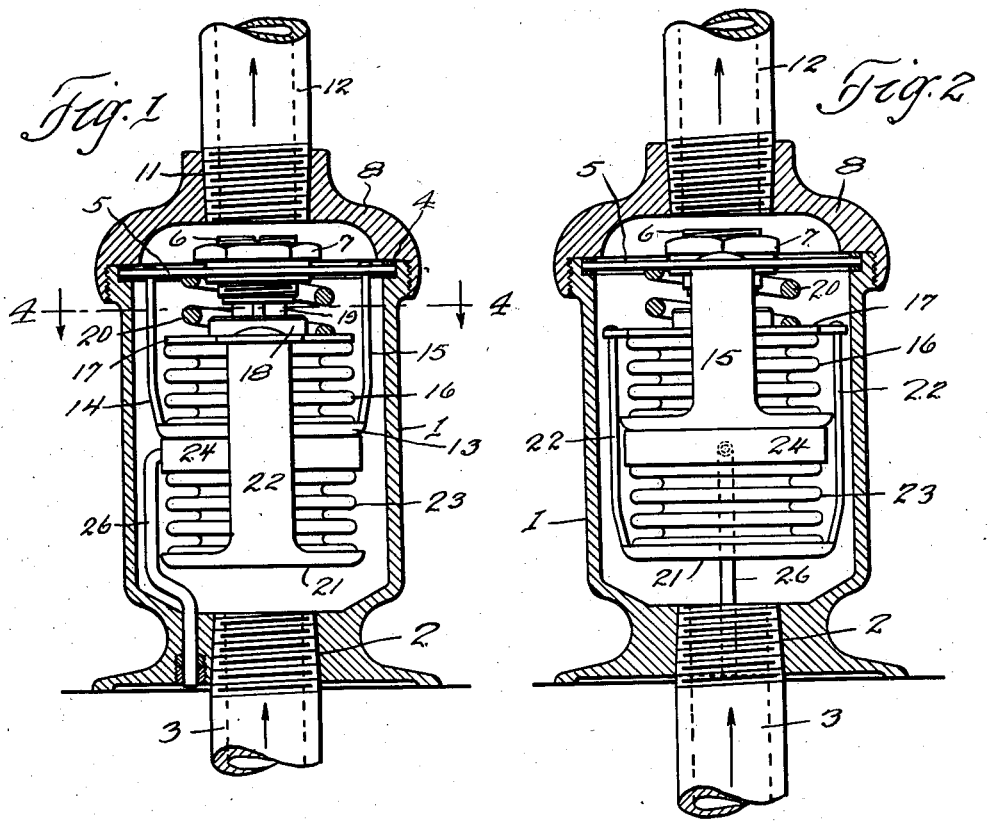
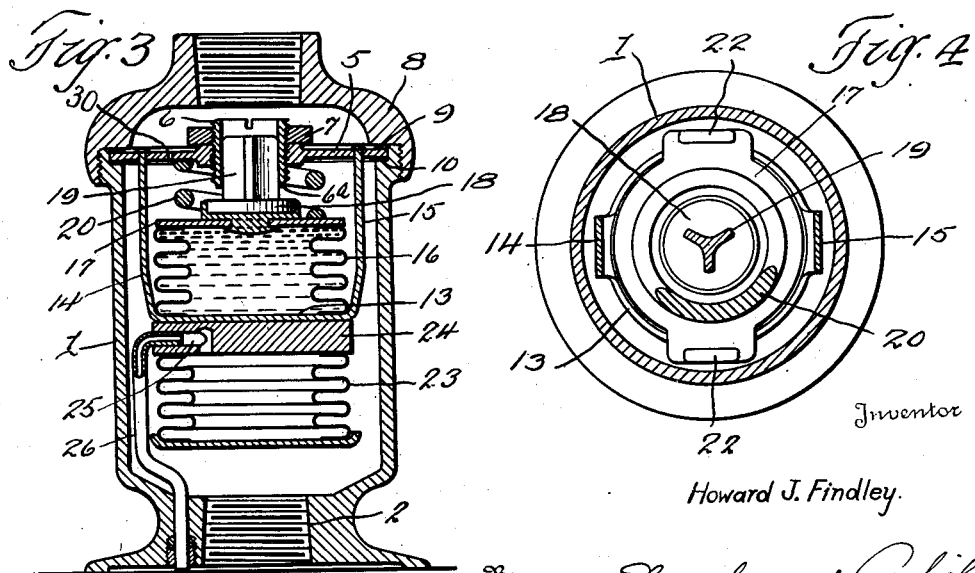
Howard J. Findley.

Patented Mar. 27, 1934

1,952,198

UNITED STATES PATENT OFFICE 1,952,198

THERMOSTATIC VALVE DEVICE

Howard J. Findley, Cleveland, Ohio, assignor to The Bishop & Babcock Manufacturing Company, Cleveland, Ohio, a corporation of Ohio Application August 3, 1932, Serial No. 627,359

8 Claims. (Cl. 236—93)

This invention relates to thermostatic valve devices for controlling the flow of water or other fluid delivered therethrough and although of general application is particularly adapted for use with a shower bath.

The main object of the invention is to provide a thermostatic valve device controlling the flow of water delivered from a shower head in such a manner that the flow of water will be cut off when the temperature exceeds a predetermined value.

I am aware that devices of this general character have heretofore been used. However, in prior devices with which I am familiar, it has been impossible to control the flow of water responsive to the temperature irrespective of the hydrostatic pressure within the shower head or conduit leading thereto. My improved thermostatic valve device obviates this difficulty and functions to cut off the flow of water irrespective of the hydrostatic pressure or head within the unit.

A valve device uninfluenced by hydrostatic head may be calibrated to a predetermined temperature and will function to cut off the flow of a shower head or the like when this temperature is attained irrespective of its being installed on the upper or lowermost floors of an apartment or the like. A valve device not incorporating this feature would only function accurately if calibrated for a predetermined pressure; or in the case of installation in an apartment or the like would not be interchangeable as to the upper and lower floors.

Another object of the invention is to provide a thermostatic valve device of the character described which will function equally well and is adapted to be installed on any floor of a building without compensating for changes of hydrostatic head.

Another object of the invention is to provide a thermostatic valve device of the character described which is simple in construction, dependable in operation, and comprises relatively few parts, and these being readily assembled and disassembled.

Another object of the invention is to provide in a thermostatic valve device of the character described for controlling the flow of water delivered therethrough, and which is provided with a thermally actuated valve, means for balancing the pressure within the unit whereby the thermostat will function to close the valve when the temperature of the water exceeds a predetermined amount irrespective of the hydrostatic pressure.

Another object of the invention is to provide a thermostatic valve device of the character described which is relatively compact and is adapted to be easily installed in the conduit line of flow.

Other objects of the invention and the invention itself will become more apparent from a consideration of the accompanying description and drawing, wherein:

Fig. 1 is a view partly in vertical medial section and partly in elevation of my invention;

Fig. 2 is a view similar to Fig. 1 but taken at right angles thereto;

Fig. 3 is a medial vertical sectional view of my invention;

Fig. 4 is a transverse sectional view taken along the lines 4—4 of Fig. 1.

Referring to the drawing, I have indicated at 1 a generally cup-shaped casing having in its base an inlet opening 2 adapted to sealingly receive therein a water supply pipe 3.

The upper or open end of the casing 1 is provided with an annular inwardly disposed shoulder 4 forming a seat for a closure or a cover plate 5, preferably circular in shape. The central portion of the closure plate 5 is somewhat thickened and is provided with a threaded opening in which is threadedly secured a bushing 6, the inner end of which is shaped to provide a valve seat 6a. The bushing is locked in place by a suitable lock nut 7 which abuts the upper face of the closure plate 5. The closure plate 5 is secured in place by means of a cap 8 which is threadedly secured over the casing 1 and tightly clamps the closure plate in place.

Suitable sealing gaskets 9 and 10 are provided for preventing leakage around the cap. The cap 8 is provided with a centrally disposed threaded opening 11 adapted to sealingly receive therein a discharge pipe 12 which leads to a shower, faucet or other suitable delivery outlet.

Carried by the plate 5 and depending therefrom is a circular supporting member 13 which is rigidly connected with the plate 5 by means of integral arms 14 and 15. The member 13 forms a supporting base for a thermostatic bellows 16 preferably formed of sylphon tubing, the lower bellows convolution being sealingly affixed to the member 13 in any suitable manner such as soldering or the like.

The upper end of the thermostatic bellows 16 is sealedly closed by a plate 17 which is affixed thereto in any suitable manner, the plate 17 forming a supporting base for an integral centrally disposed valve 18 which has a stem portion 110

19 having a generally Y-shaped cross-section as is most clearly illustrated in Fig. 4. The stem 19 projects into and slidingly engages the bushing 6 to ensure that the valve 18 will be maintained in axial alignment with the bushing and prevent any tendency to bind. The bellows 16 is adapted to be filled with an expansible fluid which is readily affected by temperature changes, whereby the bellows walls will expand or contract to actuate the valve 18.

Surrounding the bushing 6 is a coil spring 20, one end of which bears against the plate 5 and the lower end of which bears against the plate 17 and thereby serves to maintain the valve 18 in an open position until the temperature within the casing exceeds a predetermined amount whereupon the valve will be closed by the expansion of the bellows which functions as a thermostat.

Also supported by the plate 17 is a circular supporting member 21 having laterally and generally vertically disposed arms 22—22 which are rigidly connected with the plate 17 in any suitable manner and are preferably disposed substantially at right angles to the arms 14 and 15. The supporting member 21 serves as a base for a bellows 23 which is also preferably formed of sylphon tubing, the bottom convolutions of the tubing being sealedly engaged to the member 21 in any suitable manner such as soldering or the like. Closing the top of the bellows 23 is a circular block 24 which is rigidly secured to the under side of the member 13 in any suitable manner and which is provided with an angular bore 25 connecting at one end with the interior of the bellows. Leading from the opposite end of the bore 25 is a tube or the like 26 which sealingly engages the block 24 and which communicates with the atmosphere through the base of the casing 1 in such a manner that the interior of the bellows 23 is always in open communication with the atmosphere.

It is understood that the tube 26 is maintained in leak-proof relation with the base of the casing, any suitable means being employed.

The thermostatic bellows 16 thus is provided with a movable head or plate 17 which also forms a supporting member for and is integrally connected with the movable base 21 of pressure bellows 23, the plates or supporting members 17 and 21 thereby moving in unison. Water will be supplied to the casing through the pipe 3 and will completely fill the casing and discharge through the outlet connection 12. When the temperature of the water flowing through the casing exceeds a predetermined amount, the thermostatic bellows 16 will expand and move the valve 18 to the seat 6a and cut off the flow of water therethrough. The bellows 23 serves as a pressure equalizer and equalizes the pressure on opposite sides of the plate 17, the members 17 and 21 both presenting substantially equal areas to the water within the casing and being interconnected to counterbalance or neutralize the effects of hydrostatic pressure on each other since they both exert substantially equal pressure toward the other, irrespective of the pressure.

The bellows 23 being at all times in communication with the atmosphere will never offer greater than atmospheric pressure to a collapsing tendency, and since the thermostatic bellows is calibrated at atmospheric pressure, it will always function accurately irrespective of hydrostatic pressure.

The flow of water through the device will thus be cut off when a predetermined temperature is attained, and this may be varied by adjusting the position of the valve seat 6a, it being obvious that if the valve seat is disposed at a relatively greater distance from the plate 17, that a greater movement of the valve and consequently a higher temperature, will be required before the closing movement of the valve is effected. The coil spring 20 serves to resist the closing tendency of the valve 18 prematurely due to excessive pressure.

Should the volatile fluid escape from the thermostatic bellows 16, the bellows would fill or partially fill with water and the effect would be to move the valve 18 to its seat and cut off flow through the device, due to the additional hydrostatic pressure on the under side of the plate 17; thus ensuring that an excessive temperature of the water will not be developed despite derangement of the bellows.

I preferably provide a vent opening 30 in the plate 5 to permit water which would otherwise be trapped above the plate 5 after the water supply is shut off to drain and thus relieve the valve device of pressure when not in use.

Although I have shown and described a preferred embodiment of my invention, it is understood that numerous and extensive departures may be made therefrom without departing from the spirit and scope of my invention and the appended claims.

Having thus described my invention, what I claim is:—

1. In a thermostatic valve device, a casing adapted to be connected in the line of flow of a conduit, a valve and valve port controlling flow through the conduit, a thermostatic device comprising a thermally contractible and expansible chamber for opening and closing the valve port responsive to changes of fluid temperature in the conduit, a second device comprising a contractible and expansible chamber in communication with the atmosphere, both chambers having a common fixed base and interconnected movable end walls subjected to the pressure of fluid head in the conduit tending to collapse them, and the collapsing tendency of the second opposing the collapsing tendency of the first to cause the first device to respond to temperature independent of pressure.

2. In a thermostatic valve device, a casing adapted to be connected in the line of flow of a conduit, a valve and a valve port controlling flow through the conduit, a thermostatic device comprising a thermally contractible and expansible chamber for opening and closing the valve port responsive to changes of fluid temperature in the conduit, a second device comprising a contractible and expansible chamber in communication with the atmosphere, a fixed base common to both of said devices and movable interconnected end walls whereby the collapsing tendency of the first device due to fluid pressure within the conduit will be opposed by the fluid pressure exerted on the second device.

3. In a thermostatic valve device, a casing adapted to be connected in the line of flow of a conduit, a valve and a valve port controlling flow through the conduit, a thermostatic device responsive to changes of fluid temperature in the conduit for opening and closing the valve port, said thermostatic device comprising a pair of contractible and expansible bellows having a common intermediate fixed base and interconnected movable end walls, the valve being affixed to one of said end walls, one of the said bellows containing a thermally expansible fluid and the other being in communication with the atmosphere exteriorly of the casing.

4. In a thermostatic valve device, a casing adapted to be connected in the line of flow of a conduit, a partition in said casing, a valve port in the partition, a valve for opening and closing said port, a head in the casing of smaller diameter than the casing spaced from and rigidly secured to said partition, a thermostatic bellows affixed at one end to the head and having a movable wall portion carrying said valve whereby the valve will be actuated responsive to changes of temperature of fluid within the conduit, a second bellows affixed at one end to said head in communication with the atmosphere and having a movable wall portion, both bellows being subjected to the hydrostatic pressure within the casing, and a rigid member connecting both said movable wall portions whereby the collapsing tendency of the first bellows due to hydrostatic pressure will be opposed by the second bellows.

5. A thermostatic valve device, comprising a casing adapted to be installed in a conduit line of flow, a partition removably secured in said casing, an adjustable tubular element disposed in said partition and providing a valve seat at one end thereof, an expansible and contractible chamber type thermostat supported by said partition and disposed at one side thereof, a valve associated with said thermostat and operable thereby having a stem portion engaging said tubular element, and means to compensate for changes in fluid pressure on the thermostat.

6. In a thermostatic valve device, a valve device adapted to be installed in a conduit line of flow comprising a casing having end portions adapted to sealingly engage the conduit, a partition in the casing, a tubular valve element adjustably mounted in the partition adapted to have fluid flow therethrough, a fluid pressure compensated thermostat comprising a pair of bellows having a fixed common wall and rigidly connected movable end walls, one of said bellows being filled with a thermally expansible fluid, a valve affixed to said bellows adapted to seat upon said tubular valve element and having a stem portion projecting thereinto, a spring adapted to yieldingly resist the expansion of said bellows, and the second bellows adapted to communicate exteriorly of the casing with the atmosphere to act as a compensating medium for the thermostatic bellows.

7. A thermostatic valve device comprising a generally cup-shaped casing member adapted to sealingly engage a fluid conduit in the base thereof, a cover threadedly engaging said cup element adapted to sealingly engage a fluid conduit, a partition sealingly secured intermediate the said cup and cover, a tubular valve seat element adjustably supported by the partition, a transverse supporting element of smaller diameter than the casing rigidly secured to and spaced from said partition, a thermostatic bellows sealingly secured to one face of the supporting element and provided with a movable wall member, a valve carried by said movable wall member adapted to seat upon said tubular valve element, a spring adapted to yieldingly resist expanding movement of the thermostatic bellows, a second bellows sealingly supported at the opposite face of said supporting element having a movable wall member, a tube communicating interiorly with said second bellows and exteriorly with the atmosphere, both movable wall members being subjected to fluid pressure and rigid interconnecting means whereby the collapsing tendency of the thermostatic bellows will be opposed by the second bellows.

8. A thermostatic valve device comprising a casing having fluid inlet and outlet ports therein, a partition rigidly secured to said casing, a tube threadedly engaging said partition and adapted to permit flow therethrough, a lock nut engaging said tube and abutting the partition, a transverse supporting element of smaller diameter than the casing spaced from and rigidly secured to the partition by a plurality of arms, a bellows containing thermally expansible material supported by and sealingly engaging one face of said supporting element, the bellows having a movable wall element generally parallel to the supporting element, a valve affixed to said movable wall element adapted to seat against said tube and having a stem projecting thereinto, and a second bellows sealingly secured to the opposite face of said supporting element and having a movable wall element rigidly connected to the first named movable wall element, and communicating with the atmosphere for balancing the pressure on opposite sides of the supporting element whereby the thermostat will function to close the valve when the temperature of the water exceeds a predetermined amount irrespective of the hydrostatic pressure within said casing.

HOWARD J. FINDLEY.